3,529,066
METHOD OF LOWERING SERUM CHOLESTEROL
James W. Barnhart, Indianapolis, Ind., assignor to The Dow Chemical Company, Midland, Mich., a corporation of Delaware
No Drawing. Filed June 1, 1967, Ser. No. 642,683
Int. Cl. A61k 27/00
U.S. Cl. 424—346                                    6 Claims

ABSTRACT OF THE DISCLOSURE

Methods useful for lowering serum cholesterol in animals comprising administration to the animal of a hypocholesteremic amount of a 2,2'-alkylidenebisdialkylphenol compound such as 2,2'-methylenebis(4,6-di-tert-butylphenol), and compositions to be employed in practicing the method.

---

This invention relates to novel compositions and methods for using the same for reducing the concentration of cholesterol in the blood of animals. More particularly, the invention is directed to new compositions and methods for using the same to reduce cholesterol levels in the blood of vertebrate animals wherein the compositions contain a hypocholesteremic amount of a 2,2'-alkylidenebisdialkylphenol compound.

It is an object of this invention to provide novel compositions and a novel method for lowering blood cholesterol upon the administration of such compositions to animals. A further object of this invention is to provide novel compositions which have the effect of lowering blood cholesterol in warm-blooded animals and which have low toxicity and little or no pharmacological effects in other areas at dosage levels consistent with good hypocholesteremic or cholesterol-lowering activity. It is a further object of this invention to provide novel compositions which have the effect of lowering blood cholesterol in animals and which have little or no estrogenic activity at dosage levels consistent with good hypocholesteremic activity. A further object of the invention is to provide a method and compositions useful for the alleviation of hypercholesteremia in mammals.

The compositions of the invention employ as active ingredients a hypocholesteremic amount of certain of the 2,2'-alkylidenebisdialkylphenols generally disclosed and taught to be useful as antioxidants for rubber, lubricating oils and the like in US. Pats. Nos. 2,538,355; 2,570,402 and 2,734,088.

It has been found that the serum cholesterol level of warm-blooded animals may be lowered by administering to the animal a hypocholesteremic amount of a 2,2'-alkylidenebisdialkylphenol compound corresponding to the formula

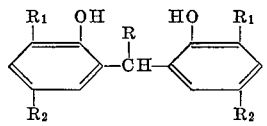

or of a suitable composition or dosage form containing as the active ingredient at least one such 2,2'-alkylidenebisdialkylphenol compound. In the present specification and claims, R represents hydrogen or methyl and $R_1$ and $R_2$ each independently represent methyl or a tertiary alkyl group containing from 4, to 5, to 6, to 7, to 8 carbon atoms, with the proviso that at least one of $R_1$ and $R_2$ is tertiary alkyl. The compound corresponding to the above formula wherein $R_1$ and $R_2$ are tertiary butyl and wherein R is hydrogen is particularly preferred for use in the compositions and method of the invention.

For the sake of convenience, compounds having the above-described chemical structure will be referred to hereinafter as "alkylidenebisphenols."

It has been found that the alkylidenebisphenols used in accordance with the invention, when administered internally to animals and in particular to mammals, have the effect of lowering the serum cholesterol content, that is, the amount of cholesterol in the blood serum of the animal to which is administered the active ingredients of the invention. The active alkylidenebisphenols are preferably administered as compositions in dosage unit form. Such compositions can be prepared by known techniques, for example, tableting or encapsulation. The dosage units preferably contain from about 100 milligrams to about 5 grams of the active compound. The compounds can also be administered as compositions adapted to be fed as part or all of the animal diet.

In forming the compositions of the invention, the active alkylidenebisphenol is incorporated in a carrier. In the present specification and claims, the term "non-toxic carrier" refers to excipients and includes nutritive compositions such as a solid or liquid foodstuff. In the present specification and claims, "excipient" refers to known pharmaceutical or veterinary excipients which are substantially non-toxic and non-sensitizing at dosages consistent with good hypocholesteremic activity.

The active alkylidenebisphenols can be formulated as solid compositions by known techniques such as tableting and encapsulation. Suitable non-toxic carriers which can be employed in preparing the solid compositions include starch, milk sugar, glucose, sucrose, gelatin, chalk, gum tragacanth, gum acacia, magnesium carbonate, magnesium stearate and the like, and compatible mixtures thereof.

The active alkylidenebisphenols can also be incorporated in non-toxic liquid carriers for administration as elixirs, syrups, emulsions and dispersions. Suitable non-toxic liquid carriers include water, etheanol, glycerine, saline, glucose syrup, sucrose syrup, propylene glycol, polyethylene glycol and the like, and compatible mixtures thereof. Oil-in-water or water-in-oil emulsions are prepared with a solution of the active compound in an oil such as corn oil, olive oil or the like constituting the oil phase and with the aid of an emulsifying agent such as gum tragacanth, gum acacia, lecithin, sorbitan monooleate, polyoxyethylene sorbitan monooleate or the like. Suspensions are prepared with the aid of suspending agents such as methyl cellulose, carboxymethyl cellulose, hydroxypropylmethyl cellulose and the like and wetting agents such as polyethylene oxide condensation products of alkylphenols, fatty acids or fatty alcohols.

The solid compositions will generally contain from about 50 to about 95 percent of the active ingredient. The liquid compositions contain from about 20 to about 60 percent of the active alkylidenebisphenol.

The compositions described above can also contain, in addition, sweetening agents such as sugar, saccharin or sodium cyclamate, flavoring agents such as caramel, preservatives such as ethyl p-hydroxybenzoate, antioxidants such as ascorbic acid and suitable coloring materials.

The active alkylidenebisphenols can also be incorporated in a foodstuff such as, for example, butter, margarine, edible oils and the like. The alkylidenebisphenol compounds can also be prepared in the form of a nutritive composition in which the active ingredient is mixed with vitamins, fats, proteins or carbohydrates and the like, or mixtures thereof. Such compositions can be prepared in liquid form such as emulsions or suspensions, as well as in solid form. The nutritive compositions are adapted to be administered as the total diet, as a part of the diet or as a supplement to the diet. The nutritive compositions preferably contain from about 0.02 to about 2 percent of the active compound when administered as the total diet. The compositions can contain higher concentrations of the alkylidenebisphenol when administered as a supplement.

The alkylidenebisphenols can also be formulated as concentrated compositions which are adapted to be diluted by admixture with liquid or solid foodstuffs. The concentrated compositions are prepared by mechanically milling or otherwise mixing the active compound with an inert carrier such as silica gel, soluble casein, starch or the like, or mixtures thereof. The concentrated compositions can also include additional ingredients such as vitamins, proteins and carbohydrates, for example.

The hypocholesteremic amount of the alkylidenebisphenol compound to be administered to an animal, that is, the amount effective to produce a substantial lowering of the serum cholesterol level, can vary depending upon such factors as the age, weight and type of animal treated, the particular alkylidenebisphenol employed, the period of administration, the method of administration, the diet of the animal and whether the animal has an abnormally high serum cholesterol level at the beginning of treatment. In general, substantial reductions of serum cholesterol can be obtained when the active compounds are administered at a dosage rate from about 10, to about 200 to about 1000 milligrams per kilogram of animal body weight per day.

The alkylidenebisphenols can be prepared by the reaction of about 2 molar proportions of a 2,4-dialkylphenol with an aldehyde such as p-formaldehyde or acetaldehyde in the presence of an acidic catalyst by the procedure described in U.S. Patent No. 2,538,355. The compounds can also be prepared by the methods described in U.S. Pats. Nos. 2,570,402 and 2,734,088.

The following examples illustrate the present invention but are not to be construed as limiting.

EXAMPLE 1

One part of 2,2'-methylenebis(4,6-di-tert-butylphenol) was dissolved in 4 parts of acetone and the solution was mixed with 3 parts of silica gel to adsorb the 2,2'-methylenebis(4,6-di-tert-butylphenol) on the silica gel. The acetone was removed by evaporation to obtain a concentrate composition containing 25 percent by weight of the alkylidenebisphenol compound.

EXAMPLE 2

0.5 part of the concentrate composition of Example 1 was mixed together with 99.5 parts of standard rodent feed on a roller mill. There was thus obtained a nutritive composition containing 0.125 percent of 2,2'-methylenebis(4,6-di-tert-butylphenol). The feed composition was adapted to be fed to rodents as the total diet.

EXAMPLE 3

A feed composition consisting of balanced rodent feed was mixed together with various amounts of an alkylidenebisphenol compound to prepare a series of separate nutritive compositions each containing 0.125 percent of one of the alkylidenebisphenol compounds. Separate groups of six male mice were fed for two weeks on separate diets consisting of one of the above-described compositions. Three separate groups of mice were similarly fed for two weeks on diets containing 0.125 percent of one of various 2,2'-alkylidenebisdialkylphenols known to be useful as antioxidants for comparison. A separate group of mice was fed for two weeks on a similar diet which contained no alkylidenebisphenol compound to serve as a check. At the end of the two week period, the mice were exsanguinated under ether anesthesia. Serum cholesterol was determined by taking a 0.05 milliliter aliquot of serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check group of mice was used as the basis for calculating percentage reduction of cholesterol. The percentage reduction of cholesterol for the particular alkylidenebisphenol compounds employed and the percentage reduction for the antioxidant 2,2'-alkylidenebisdialkylphenols are set out in the following table.

TABLE I

| Alkylidenebisphenol compound: | Percent reduction of cholesterol |
|---|---|
| 2,2'-methylenebis(4,6-di-tert-butylphenol) | 27 |
| 2,2' - methylenebis[6-methyl - 4 - (1,1,3,3-tetramethylbutyl)phenol] | 15 |
| 2,2' - methylenebis(6 - methyl - 4 - tert - butylphenol) | 14 |
| 2,2' - ethylidenebis(6 - tert - butyl - 4 - methylphenol) | 15 |
| 2,2' - isopropylidenebis(4,6 - di - tert - butylphenol) | 0 |
| 2,2' - cyclohexylidenebis(4,6 - di - tert - butylphenol) | 0 |
| 2,2' - (isopentylidene) - bis(4 - tert - butyl - 6 - methylphenol) | 0 |
| 2,2'-methylenebis(3,5-di-tert-butylphenol) | 0 |

EXAMPLE 4

Fifty parts of 2,2'-methylenebis(4,6-di-tert-butylphenol) are mixed with 10 parts of corn starch, 5 parts of alginic acid and 3.5 parts of magnesium stearate on conventional mixing apparatus. The mixture is compressed into slugs which are then broken into granules and passed through an eight mesh screen. 3.5 parts of magnesium stearate are mixed with the granules and the mixture is then compressed into tablets weighing 0.5 gram each. The tablets thus provide a dosage form suitable for administration to animals for the purpose of reducing serum cholesterol or for alleviation of hypercholesteremia.

EXAMPLE 5

Twenty parts of 2,2' - methylenebis(4,6 - di-tert-butylphenol) are dissolved in a mixture consisting of 5 parts of wheat germ oil and 70 parts of corn oil. The solution is filled into gelatin capsules in the amount of 1 gram per capsule. The capsules are suitable for oral administration to animals.

What is claimed is:

1. A method useful for lowering serum cholesterol in animals, the method comprising administering orally to an animal having an abnormally high serum cholesterol level from about 10 to about 1000 milligrams per kilogram of animal body weight per day of a 2,2'-alkylidenebisdialkylphenol compound corresponding to the formula

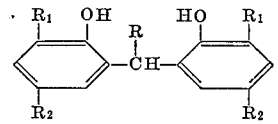

wherein R represents a member of the group consisting of hydrogen and methyl, $R_1$ in each occurrence thereof represents the same member of the group consisting of methyl and tertiary alkyl groups containing from 4 to 8 carbon atoms, inclusive, and $R_2$ in each occurrence thereof represents the same member of the group consisting of methyl and tertiary alkyl groups containing from 4 to 8 carbon atoms, inclusive, with the proviso that at least one of $R_1$ and $R_2$ is tertiary alkyl.

2. The method of claim 1 wherein the compound is 2,2'-methylenebis(4,6-di-tert-butylphenol).

3. The method of claim 1 wherein the compound is 2,2'-methylenebis[6-methyl-4-(1,1,3,3 - tetramethylbutyl)-phenol].

4. The method of claim 1 wherein the compound is 2,2'-ethylidenebis(6-tert-butyl-4-methylphenol).

5. The method of claim 1 wherein the compound is 2,2'-methylenebis(6-methyl-4-tert-butylphenol).

6. The method of claim 1 wherein the compound is fed to the animal daily at a dosage rate of from about 200 milligrams to about 1000 milligrams per kilogram of animal body weight.

References Cited

UNITED STATES PATENTS 3,279,922  10/1966  Jaworski _____ 99—8 X

FOREIGN PATENTS 1,088,455  10/1967  Great Britain.

OTHER REFERENCES

Bickoff et al.: Bisphenol Derivatives As Antioxidants For Carotene. J. Am. Oil Chem. Soc., vol. 32, p. 64–68, 1955.

ALBERT T. MEYERS, Primary Examiner

L. SCHENKMAN, Assistant Examiner